S. G. K. PAYNE.
COMBINED GUARD AND PROTECTOR FOR HAT PINS.
APPLICATION FILED APR. 18, 1911.
1,019,695.
Patented Mar. 5, 1912.
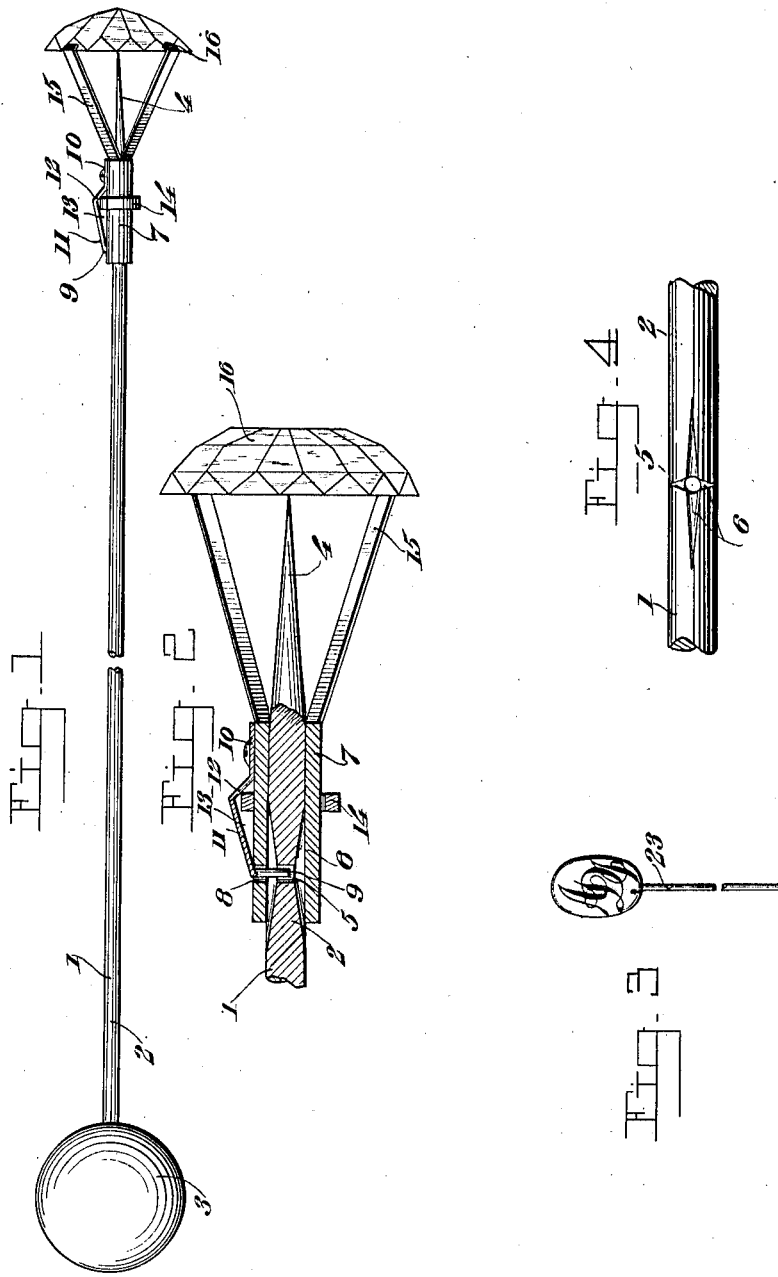
Inventor
Sarah G. K. Payne
Witnesses
A. W. Gardes
By Victor J. Evans
Attorney

UNITED STATES PATENT OFFICE.

SARAH G. K. PAYNE, OF GREENPORT, NEW YORK.

COMBINED GUARD AND PROTECTOR FOR HAT-PINS.

1,019,695.  Specification of Letters Patent.  Patented Mar. 5, 1912.

Application filed April 18, 1911. Serial No. 621,791.

*To all whom it may concern:*

Be it known that I, SARAH G. K. PAYNE, a citizen of the United States, residing at Greenport, Long Island, in the county of Suffolk and State of New York, have invented new and useful Improvements in Combined Guards and Protectors for Hat-Pins, of which the following is a specification.

This invention relates to a combined guard and protector for pointed objects such as hat pins, scarf pins or the like, and has for an object to provide a device of this character which will protect the protruding point of the pin and hold the same against such exposure which would possibly result in injury to one coming accidentally in contact with the pin.

In the drawing, forming a portion of this specification and in which like numerals of reference indicate similar parts in the several views:—Figure 1 is a side view of a hat pin showing the protector applied thereto. Fig. 2 is a section through a portion of the pin and through the protector. Fig. 3 is a front view of a scarf pin showing a slightly modified form of protector applied thereto. Fig. 4 is a side view of a portion of the pin on which my improved protector is adapted for use.

With particular reference to Figs. 1 and 2, and Fig. 5, it will be seen that the hat pin 1 embodies a suitable shank member 2 which is formed at one end with an ornamental head 3 and at the opposite end with a relatively sharp point 4. Adjacent to the point, the shank of the pin is provided with a transverse opening 5 and formed in the shank of the pin on the outer surface thereof are radial guiding grooves 6.

My improved protector comprises a sleeve 7 which is designed to receive the pointed end of the shank 2. This sleeve has an opening 8 therein through which the retaining stud 9 normally extends, the said stud being formed as an integral part of the spring 10 or it may be formed separate therefrom as the occasion may demand. The stud 9 is preferably located on the outer extremity of the inclined portion 11 of the spring. The spring 10 is provided with an offset portion 12 which connects the attaching portion of the spring with the downwardly and forwardly inclined portion 11, serving to hold the portion 11 in such position with respect to the external surface of the sleeve 7 so as to provide an intervening substantially V-space 13 of an inwardly reduced diameter. A stud releasing ring 14 is slidable longitudinally on the sleeve 7 and is confined in the space 13, being constructed so as to contact with the inner surface of the portion 11 as shown in Fig. 2 of the drawing. The outer end of the sleeve 7 has integral arms 15 thereon which provide a seating for the precious gem or other suitable ornamental object 16. The object 16 is spaced suitably from the outer end of the sleeve 7 so as to accurately limit the adjustment of the protecting device on the shank 2.

In operation, the hat pin 1 is passed through the hat of the wearer in the ordinary manner. My improved protecting device is then extended onto the pointed end of the pin and the pin and protector respectively are manipulated so as to cause the stud 9 to be guided into one of the grooves 6 so that on further manipulation, the stud 9 will be directed into the eye or passage 5 in the pin shank. When it is desired to release the protecting device from the pin shank the sleeve 14 is grasped by the fingers of the operator and moved in the direction of the stud 9. In other words, the ring 14 is moved in the direction of the small end of the recess 13 so as to cause itself to crowd against the inclined portion 11 of the stud carrying spring. This spring is such that the inclined portion 11 will be forced outwardly so as to cause the stud 9 to be released from the opening 5. The shank 2 and the protecting device are then free for separation from each other.

In the form of the invention shown in Fig. 3, a scarf pin 23 is provided. The protecting device 24 therein is substantially identical with the device described in the preferred form and is adapted to be fitted to the point of the pin after the latter has been properly adjusted in the scarf. The protector 24 while being substantially identical with that described in the preferred form of my invention need not be provided with the ornamental object 16 and in lieu thereof, it is preferable to employ a small knob like portion 25 for the convenience in manipulation of the device.

While it is described that the device is intended to protect the point of the pin and to guard against the loss of the pin from the object with which it is engaged it will of course be understood that the protector may be put to any obvious use which may suggest itself in practice.

I claim:

A pointed pin having an opening adjacent the point, a protector for the point of the pin embodying a member embracing the pointed end of the pin and provided with an opening therein, a spring having an inclined portion, the said spring being secured to the member and having a pin engaging portion for engaging the pin to hold the same against disengagement from the member, and a ring slidable on the member beneath the inclined portion of the spring and operating to release the pin-engaging portion thereof from the opening in the pin.

In testimony whereof I affix my signature in presence of two witnesses.

SARAH G. K. PAYNE.

Witnesses:
MADELINE F. HORTON,
FREDERICK H. TASKER.

Copies of this patent may be obtained for five cents each, by addressing the "Commissioner of Patents. Washington, D. C."